United States Patent [19]

Mahmud et al.

[11] Patent Number: 5,749,950
[45] Date of Patent: May 12, 1998

[54] INK AND COATING COMPOSITIONS CONTAINING SILICON-TREATED CARBON BLACK

[75] Inventors: Khaled Mahmud, Tyngsboro; James A. Belmont, Acton; Curtis E. Adams, Watertown, all of Mass.; John K. Foster, Windham, N.H.

[73] Assignee: Cabot Corporation, Boston, Mass.

[21] Appl. No.: 789,984

[22] Filed: Jan. 28, 1997

Related U.S. Application Data

[62] Division of Ser. No. 663,693, Jun. 14, 1996.

[51] Int. Cl.$^6$ .................................................... C09D 11/00
[52] U.S. Cl. .......................... 106/316; 106/31.9; 106/475
[58] Field of Search .......................... 106/31.6, 31.65, 106/31.9, 475

[56] References Cited

U.S. PATENT DOCUMENTS

| | | | |
|---|---|---|---|
| T860,001 | 3/1969 | Gessler. | |
| 1,999,573 | 4/1935 | Odell | 106/474 |
| 2,121,535 | 6/1938 | Amon | 106/473 |
| 2,156,591 | 5/1939 | Jacobson | 106/475 |
| 2,375,795 | 5/1945 | Krejci | 423/456 |
| 2,502,254 | 3/1950 | Glassman | 106/476 |
| 2,514,236 | 7/1950 | Glassman | 106/476 |
| 2,564,700 | 8/1951 | Krejci | 423/456 |
| 2,625,492 | 1/1953 | Young | 106/20 R |
| 2,632,713 | 3/1953 | Krejci | 106/475 |
| 2,793,100 | 5/1957 | Weihe | 423/460 |

(List continued on next page.)

FOREIGN PATENT DOCUMENTS

| | | |
|---|---|---|
| 0 006 190 A1 | 1/1980 | European Pat. Off. . |
| 272127 | 6/1988 | European Pat. Off. . |
| 0 411 160 A1 | 2/1991 | European Pat. Off. . |
| 433229 | 6/1991 | European Pat. Off. . |
| 0 441 987 A2 | 8/1991 | European Pat. Off. . |
| 0 501 227 A1 | 9/1992 | European Pat. Off. . |
| 410152 | 2/1994 | European Pat. Off. . |
| 636591 | 2/1995 | European Pat. Off. . |
| 0 641 823 A1 | 3/1995 | European Pat. Off. . |
| 0 646 621 A1 | 4/1995 | European Pat. Off. . |
| 0 675 175 A2 | 10/1995 | European Pat. Off. . |
| 0 711 805 A1 | 5/1996 | European Pat. Off. . |
| 1164786 | 4/1960 | France . |
| 1215895 | 4/1960 | France . |
| 72775 | 4/1960 | France . |
| 1224131 | 6/1960 | France . |
| 1331889 | 5/1963 | France . |
| 1459019 | 8/1965 | France . |
| 1499348 | 9/1969 | France . |
| 2477593 | 11/1981 | France . |
| 2564489 | 11/1985 | France . |
| 2607528 | 6/1988 | France . |
| 24 26 266 A1 | 12/1975 | Germany . |
| 3170748 | 7/1985 | Germany . |
| 35 02 494 A1 | 8/1985 | Germany . |
| 59182467 | 5/1984 | Japan . |
| 11275666 | 11/1989 | Japan . |
| 5-178604 | 7/1993 | Japan . |
| 51271365 | 10/1993 | Japan . |
| 51339516 | 12/1993 | Japan . |
| 61025572 | 2/1994 | Japan . |
| 61067421 | 3/1994 | Japan . |
| 61073235 | 3/1994 | Japan . |
| 7-30269 | 4/1995 | Japan . |
| 862018 | 3/1961 | United Kingdom . |
| 1139620 | 1/1969 | United Kingdom . |
| 1191872 | 5/1970 | United Kingdom . |
| 1213186 | 11/1970 | United Kingdom . |
| 1363428 | 8/1974 | United Kingdom . |
| 2044741 | 10/1980 | United Kingdom . |
| WO 91/15425 | 10/1991 | WIPO . |
| WO 92/13983 | 8/1992 | WIPO . |
| WO 96/18688 | 6/1996 | WIPO . |
| WO 96/18696 | 6/1996 | WIPO . |
| WO 96/37546 | 11/1996 | WIPO . |
| WO 96/37547 | 11/1996 | WIPO . |
| WO 97/10291 | 3/1997 | WIPO . |

(List continued on next page.)

OTHER PUBLICATIONS

88–116672 (Derwent), Entitled: Surface treatment of carbon black for powder coating—by dispersing in water, adjusting pH and adding aq. soln. of sodium silicate. (Abstract), Mar. 1988.

PCT International Search Report dated Nov. 6, 1997.

Derwent Abstract, AN No. 80–03330C, "Sulphonated Carbon Pigment Production by Treating Technical Grade Carbon with Hot Aqueous Acid," SU.A.659,523, Apr. 1979.

Derwent Abstract, AN No. 82–28019E, "Penetrating Flexographic Print Ink Based Polyacrylic Resin," Oct. 17, 1979, SU.A.843062.

Derwent Abstract, AN No. 86–335147, "Wear Resistant Rubber Composition for Tire Tread Rubber," Apr. 30, 1985, JPA 61–250042, Nov. 1986.

Derwent Abstract WPI Acc No. 94–031974/04, Japanese Patent Application No. 92145679, Jun. 1992.

Derwent Abstract WPI Acc No. 94–072121/09, Japanese Patent Application No. 9295517, Apr. 1992.

Derwent Abstract WPI Acc No. 94–121502/15, Japanese Patent Application No. 92241473, Aug. 1992.

Derwent Abstract WPI Acc No. 94–124167/15, Japanese Patent Application No. 9133147, Feb. 1991.

Derwent Abstract, AN No. 95–183086, "Tire Treated Rubber Composition," Oct. 21, 1993, JPA 07102116.

(List continued on next page.)

*Primary Examiner*—Helene Klemanski

[57] ABSTRACT

Ink and coating compositions are disclosed comprising a silicon-treated carbon black. The silicon-treated carbon black may have at least one attached organic group, and the ink and coating compositions may comprise a combination of silicon-treated carbon black products, with and/or without at least one attached organic group, and untreated carbon black. Methods are disclosed for improving the jetness, improving the blue tone, improving the platewear, reducing the premix residue, modifying rheological properties, or improving waterfastness, of ink and coating compositions by incorporating therein silicon-treated carbon black.

21 Claims, No Drawings

U.S. PATENT DOCUMENTS

| | | | |
|---|---|---|---|
| 2,833,736 | 5/1958 | Glaser | 83/409 |
| 2,867,540 | 1/1959 | Harris | 106/476 |
| 2,891,595 | 6/1959 | Kintz et al. | 152/564 |
| 3,011,902 | 12/1961 | Jordon | 106/30 R |
| 3,025,259 | 3/1962 | Wason et al. | 106/476 |
| 3,043,708 | 7/1962 | Watson et al. | 106/476 |
| 3,094,428 | 6/1963 | Hamilton et al. | 106/475 |
| 3,188,225 | 6/1965 | Forbes | 106/475 |
| 3,203,819 | 8/1965 | Steenken et al. | 106/475 |
| 3,290,165 | 12/1966 | Iannicelli | 106/475 |
| 3,317,458 | 5/1967 | Clas et al. | 106/475 |
| 3,335,020 | 8/1967 | Aboytes et al. | 106/476 |
| 3,390,006 | 6/1968 | Takewell et al. | 106/475 |
| 3,479,300 | 11/1969 | Rivin et al. | 106/474 |
| 3,528,840 | 9/1970 | Aboytes | 106/473 |
| 3,607,813 | 9/1971 | Purcell et al. | 106/20 R |
| 3,622,650 | 11/1971 | Berstein et al. | 106/475 |
| 3,660,132 | 5/1972 | Illigen et al. | 106/475 |
| 3,663,285 | 5/1972 | Graf et al. | 106/475 |
| 3,674,670 | 7/1972 | Erikson et al. | 106/20 R |
| 3,686,111 | 8/1972 | Makhlouf et al. | 524/530 |
| 3,689,452 | 9/1972 | Burke, Jr. | 106/475 |
| 3,716,513 | 2/1973 | Burke, Jr. | 106/475 |
| 3,846,141 | 11/1974 | Ostergren et al. | 106/20 R |
| 3,873,489 | 3/1975 | Thurn et al. | 524/262 |
| 3,876,603 | 4/1975 | Makhlouf | 106/476 |
| 3,997,356 | 12/1976 | Thurn et al. | 106/483 |
| 4,003,751 | 1/1977 | Carder | 106/20 R |
| 4,006,031 | 2/1977 | Ferch et al. | 106/473 |
| 4,014,833 | 3/1977 | Story | 106/472 |
| 4,014,844 | 3/1977 | Vidal et al. | 106/472 |
| 4,061,830 | 12/1977 | Greenberg | 106/287.18 |
| 4,071,496 | 1/1978 | Kraus et al. | 524/495 |
| 4,074,035 | 2/1978 | Powers et al. | 526/185 |
| 4,108,679 | 8/1978 | Szczepanik et al. | 106/475 |
| 4,176,361 | 11/1979 | Kawada et al. | 106/20 R |
| 4,204,871 | 5/1980 | Johnson et al. | 106/20 R |
| 4,204,876 | 5/1980 | Bowden | 106/474 |
| 4,211,578 | 7/1980 | Scott, IV | 106/475 |
| 4,229,333 | 10/1980 | Wolff et al. | 524/571 |
| 4,290,072 | 9/1981 | Mansukhani . | |
| 4,293,394 | 10/1981 | Darlington et al. | 205/524 |
| 4,297,145 | 10/1981 | Wolff et al. | 106/475 |
| 4,308,061 | 12/1981 | Iwahashi et al. | 106/20 R |
| 4,328,041 | 5/1982 | Wilson | 106/476 |
| 4,360,627 | 11/1982 | Okado et al. | 524/496 |
| 4,442,256 | 4/1984 | Miller | 524/539 |
| 4,451,597 | 5/1984 | Victorius | 524/39 |
| 4,468,496 | 8/1984 | Takeuchi et al. | 525/233 |
| 4,476,270 | 10/1984 | Brasen et al. | 524/364 |
| 4,478,905 | 10/1984 | Neely, Jr. | 428/324 |
| 4,503,174 | 3/1985 | Vasta | 523/439 |
| 4,503,175 | 3/1985 | Houze et al. | 524/39 |
| 4,517,335 | 5/1985 | Wolff et al. | 524/552 |
| 4,525,521 | 6/1985 | DenHartog et al. | 524/517 |
| 4,525,570 | 6/1985 | Blum et al. | 528/75 |
| 4,530,961 | 7/1985 | Nguyen et al. | 106/20 R |
| 4,544,687 | 10/1985 | Schupp et al. | 523/414 |
| 4,555,535 | 11/1985 | Bednarek et al. | 524/40 |
| 4,556,427 | 12/1985 | Lewis | 106/20 R |
| 4,590,052 | 5/1986 | Chevallier et al. | 423/335 |
| 4,597,794 | 7/1986 | Ohta et al. | 106/20 C |
| 4,605,542 | 8/1986 | Harada | 423/345 |
| 4,605,596 | 8/1986 | Fry | 428/423.3 |
| 4,620,993 | 11/1986 | Suss et al. | 427/407.1 |
| 4,620,994 | 11/1986 | Suss et al. | 427/407.1 |
| 4,650,718 | 3/1987 | Simpson et al. | 428/413 |
| 4,659,770 | 4/1987 | Vasta | 524/553 |
| 4,665,128 | 5/1987 | Cluff et al. | 525/131 |
| 4,670,059 | 6/1987 | Hackleman et al. | 106/475 |
| 4,680,204 | 7/1987 | Das et al. | 427/407.1 |
| 4,681,811 | 7/1987 | Simpson et al. | 428/413 |
| 4,692,481 | 9/1987 | Kelly | 523/219 |
| 4,710,543 | 12/1987 | Chattha et al. | 525/161 |
| 4,713,427 | 12/1987 | Chattha et al. | 525/510 |
| 4,719,132 | 1/1988 | Porter, Jr. | 427/409 |
| 4,727,100 | 2/1988 | Vasta | 524/40 |
| 4,741,780 | 5/1988 | Atkinsoon | 106/477 |
| 4,752,532 | 6/1988 | Starka | 428/482 |
| 4,764,430 | 8/1988 | Blackburn et al. | 428/413 |
| 4,770,706 | 9/1988 | Pietsch | 106/20 R |
| 4,789,400 | 12/1988 | Solodar et al. | 106/20 R |
| 4,798,745 | 1/1989 | Martz et al. | 427/407.1 |
| 4,798,746 | 1/1989 | Claar et al. | 427/407.1 |
| 4,808,656 | 2/1989 | Kania et al. | 524/512 |
| 4,820,751 | 4/1989 | Takeshita et al. | 523/215 |
| 4,822,844 | 4/1989 | Kawakami et al. | 524/496 |
| 4,824,900 | 4/1989 | Sakurai | 524/495 |
| 4,840,674 | 6/1989 | Schwarz | 106/20 R |
| 4,853,037 | 8/1989 | Johnson et al. | 106/20 R |
| 4,866,131 | 9/1989 | Fujimaki et al. | 525/96 |
| 4,883,838 | 11/1989 | Jung et al. | 525/119 |
| 4,894,420 | 1/1990 | Scriver | 525/237 |
| 4,908,397 | 3/1990 | Barsotti et al. | 523/400 |
| 4,914,148 | 4/1990 | Hille et al. | 524/507 |
| 4,927,868 | 5/1990 | Schimmel et al. | 523/439 |
| 4,975,474 | 12/1990 | Barsotti et al. | 523/400 |
| 4,994,520 | 2/1991 | Mori et al. | 524/547 |
| 5,008,223 | 4/1991 | Speer et al. | 106/450 |
| 5,008,335 | 4/1991 | Pettit, Jr. | 525/111 |
| 5,017,435 | 5/1991 | Barsotti et al. | 428/502 |
| 5,026,755 | 6/1991 | Kveglis et al. | 524/389 |
| 5,051,464 | 9/1991 | Johnson et al. | 524/555 |
| 5,064,719 | 11/1991 | DenHartog et al. | 428/411.1 |
| 5,066,733 | 11/1991 | Martz et al. | 525/455 |
| 5,076,843 | 12/1991 | Acitelli et al. | 106/22 R |
| 5,093,391 | 3/1992 | Barsotti et al. | 523/400 |
| 5,093,407 | 3/1992 | Komai et al. | 524/495 |
| 5,100,470 | 3/1992 | Hindagolla et al. | 106/22 R |
| 5,106,417 | 4/1992 | Hauser et al. | 106/20 R |
| 5,109,055 | 4/1992 | Nagasaki et al. | 524/571 |
| 5,114,477 | 5/1992 | Mort et al. | 106/476 |
| 5,122,552 | 6/1992 | Johnson | 523/454 |
| 5,130,004 | 7/1992 | Johnson et al. | 523/404 |
| 5,130,363 | 7/1992 | Scholl et al. | 524/392 |
| 5,141,556 | 8/1992 | Matrick | 106/20 R |
| 5,152,801 | 10/1992 | Altermatt et al. | 106/473 |
| 5,159,009 | 10/1992 | Wolff et al. | 106/475 |
| 5,162,409 | 11/1992 | Mroczkowski | 524/262 |
| 5,168,106 | 12/1992 | Babcock et al. | 524/495 |
| 5,173,111 | 12/1992 | Krishnan et al. | 106/20 R |
| 5,179,191 | 1/1993 | Jung et al. | 528/272 |
| 5,182,355 | 1/1993 | Martz et al. | 528/75 |
| 5,184,148 | 2/1993 | Suga et al. | 106/20 R |
| 5,190,582 | 3/1993 | Shinozuka et al. | 106/20 D |
| 5,200,164 | 4/1993 | Medalia et al. | 423/265 |
| 5,204,404 | 4/1993 | Werner, Jr. et al. | 524/501 |
| 5,206,295 | 4/1993 | Harper et al. | 525/207 |
| 5,221,581 | 6/1993 | Palmer et al. | 428/425.8 |
| 5,227,425 | 7/1993 | Rauline | 524/493 |
| 5,229,452 | 7/1993 | Green et al. | 524/415 |
| 5,232,974 | 8/1993 | Branan, Jr. et al. | 524/495 |
| 5,236,992 | 8/1993 | Bush | 524/495 |
| 5,242,751 | 9/1993 | Hartman | 428/324 |
| 5,266,361 | 11/1993 | Schwarte et al. | 427/407.1 |
| 5,266,406 | 11/1993 | DenHartog et al. | 428/423.1 |
| 5,276,097 | 1/1994 | Hoffmann et al. | 525/167 |
| 5,281,261 | 1/1994 | Lin | 106/20 R |
| 5,286,286 | 2/1994 | Winnik et al. | 106/21 A |
| 5,286,291 | 2/1994 | Bernhardt et al. | 106/475 |
| 5,288,788 | 2/1994 | Shieh et al. | 524/495 |
| 5,290,848 | 3/1994 | Palmer et al. | 524/517 |

| | | | |
|---|---|---|---|
| 5,294,253 | 3/1994 | Carlson et al. | 106/475 |
| 5,302,197 | 4/1994 | Wickramanayke et al. | 106/20 R |
| 5,310,778 | 5/1994 | Shor et al. | 106/20 D |
| 5,314,945 | 5/1994 | Nickle et al. | 524/507 |
| 5,314,953 | 5/1994 | Corcoran et al. | 525/123 |
| 5,319,044 | 6/1994 | Jung et al. | 526/279 |
| 5,320,738 | 6/1994 | Kaufman | 205/317 |
| 5,324,790 | 6/1994 | Manring | 525/329.9 |
| 5,328,949 | 7/1994 | Sandstrom | 524/262 |
| 5,334,650 | 8/1994 | Serdiuk et al. | 524/591 |
| 5,336,716 | 8/1994 | Kappes et al. | 525/23 |
| 5,336,730 | 8/1994 | Sandstrom | 525/332.6 |
| 5,336,753 | 8/1994 | Jung et al. | 528/335 |
| 5,352,289 | 10/1994 | Weaver et al. | 106/476 |
| 5,356,973 | 10/1994 | Taljan et al. | 524/314 |
| 5,366,828 | 11/1994 | Struthers | 429/101 |
| 5,401,313 | 3/1995 | Supplee et al. | 106/475 |
| 5,401,789 | 3/1995 | Wolf et al. | 524/188 |
| 5,430,087 | 7/1995 | Carlson et al. | 106/475 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,622,557 | 4/1997 | Mahmud et al. | 106/475 |

OTHER PUBLICATIONS

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.

Roberts et al., *Basic Principles of Organic Chemistry*, Second Edition, W.A. Benjamin, Inc., Pub., p. 1080, no date available.

Allen, "Thermal Ink Jet Printing Trends and Advances," BIS Ink Jet Printing Conference, Oct. 10–12, 1994, Monterey, California.

Schneider, "Continuous Ink Jet," BIS Ink Jet Printing Conference, Oct. 10–12, 1994, Monterey, California.

Major, "Formulating the Future of Automotive Coatings," *Modern Paint and Coatings*, Jul. 1993.

Greenfield, "Fewer Formulation Options Lead to Emphasis on Familiar," *Modern Paint and Coatings*, Jul. 1992.

Schrantz, "Regulations and Competition Push Technological Change," *Modern Paint and Coatings*, Jul. 1994.

"Regulations Focus Formulator Attention on Additives," *Modern Paint and Coatings*, Jul. 1994.

*The Printing Ink Manual*, Fifth Edition, R.H. Leach et al., Blueprint Press, Chapters 8, 9, and 10, no date.

Tsubokawa, "Functionalization of Carbon Black by Surface Grafting of Polymers,"*Polym. Sci.*, vol. 17, pp. 417–470, 1992, no month available.

Wolff et al., "The Influence of Modified Carbon Blacks on Viscoelastic Compound Properties," *Kautschuk & Gummi, Kuststoffe* 44, Jahrgang, Nr. Oct. 1991.

Bourdillon et al., "Immobilization of Glucose Oxidase on a Carbon Surface Derivatized by Electrochemical Reduction of Diazonium Salts," *J. Electroanal. Chem.*, vol. 336, pp. 113–123, 1992, no month.

Ohkita et al., "The Reaction of Carbon Black Surface with 2.2-Diphenyl-1-Picrylhydrazyl," *Carbon*, vol. 10, No. 5, pp. 631–636, Mar. 1972.

Watson, "Chemical Aspects of Reinforcement," Compounding Research Department, Dunlop Research Center, Dunlop Rubber Co., p. 987–999, no date available.

Garten et al., "Nature of Chemisorptive Mechanisms in Rubber Reinforcement," Commonwealth Scientific and Industrial Research Organ., Div. of Industrial Chem., Melbourne, Australia, pp. 596–609, no date available.

Donnet et al., "Chimie Superficielle et Sites Privilegies Des Charges Fines," Extrait de la Revue Generale du Caoutchoic, Jul. 1959.

*Ullmann's Encyclopedia of Industrial Chemistry*, Fifth Edition, vol. A–8, pp. 508–509, 1987, no month.

Donnet et al., "Sur la Structure Aroxylique des Groupements Quinoniques et des Radicaux Libres Presentes en Surface des Noirs de Carbon," *Ref. Gen. Caoutchouc Plastiques*, vol. 42, No. 3, pp. 389–392, 1965 (with English Abstract, no month available.

Yamaguchi et al., "Novel Carbon Black/Rubber Coupling Agent," *Kautschuk & Gummi*, Kuntstoffe 42, Jahrgang, Nr. May, 1989.

Studebaker et al., "Oxygen–Containing Groups on the Surface of Carbon Black," *Industrial and Engineering Chemistry*, vol. 48, No. 1, pp. 162–166, Jan. 1956.

Zoheidi et al., "Role of Oxygen Surface Groups in catalysis of Hydrogasification of Carbon Black by Potassium Carbonate," *Carbon*, vol. 25, No. 6, pp. 809–819, 1987, no month available.

Scherrer, "Coloration of Ink Jet Inks," Presentation at BIS Ink Jet Printing Conference, Oct. 10–12, 1994, Monterey.

*Ink Jet Printing: 1994 Overview and Outlook*, Chapter 7, no month available.

*The Printing Ink Manual*, Fourth Edition, Chapter 2, Leach et al., Eds., 1988, no month available.

Andreottoia, *Ink Jet Ink Technology*, pp. 531–544, no date available.

Gregory, *High–Technology Applications of Organic Colorants*, Chapter 9, "Ink–Jet Printing," 1991, no month.

PCT Search Report, PCT/US 95 16452, Apr. 17, 1996.
PCT Search Report, PCT/US 95/16195, Apr. 19, 1996.
PCT Search Report, PCT/US 95/16281, Apr. 26, 1996.
PCT Search Report, PCT/IB 95/01154, Apr. 29, 1996.
PCT Search Report, PCT/US 95/16453, May 15, 1996.
Chemical Abstract No. 113:116901, Nov. 6, 1989.
Chemical Abstract No. 120325954, Feb. 1, 1994.
RAPRA Abstract No. 432845, "Compounding Heat Resistant Non–Black EPDM Rubber Compounding Report," Dec. 1990.

RAPRA Abstract No. 417612, "Review: Polymer–Filler Interactions in Rubber Reinforcement," Oct. 1990.

RAPRA Abstract No. 403202, "Organotitanate, Zirconate Effect on Elastomers," Jun. 1990.

RAPRA Abstract No. 394030, "Mechanical Properties of Natural Rubber/Grafted Cellulose Fibre Composites," 1990, no month available.

RAPRA Abstract No. 390600, "Application of Coupling Agents to Elastomers," 1989, no month.

RAPRA Abstract No. 00388935, "Light Coulored Fillers in Polymers," Nov. 1989.

Dialog Abstract EMA Number 8602–C1–D–0297, "Carbon Black is Better With Silica," Oct. 1985.

RAPRA Abstract No. 00343229, "White and Black Fillers for Rubber Compounds," Dec. 1986.

RAPRA Abstract No. 00177481, "Ethylene–Propylene Rubbers," 1981, no month available.

RAPRA Abstract No. 00105623, "Putting Performance into Thermosets with Titanium Coupling Agents," Oct. 1976.

RAPRA Abstract No. 00056893, "Applications for Silane Coupling Agents in the Automotive Industry," Oct. 1975.

RAPRA Abstract No. 00002608, "Ground Rice Hull Ash as a Filler for Rubber," Oct. 1974.

RAPRA Abstract No. 00000937, "Reduction of Heat Build–up in Mineral–Filled Elastomers Through the Use of Silane Coupling Agents," May 1973.

Derwent Abstract, Japanese Patent Publication No. 80–73657, Mar. 19, 1996.

Derwent Abstract, WPI Acc No. 78–73373A/41, Japanese Patent Application No. 53–100190, Sep. 1978.

Derwent Abstract, WPI Acc No. 95–019436/03, Japanese Patent Application No. 63–06289, Nov. 1994.

Derwent Abstract, WPI Acc No. 92–369382/45, Japanese Patent Application No. 4–270199, Sep. 1992.

Derwent Abstract, WPI Acc No. 90–335599/45, DD No. 279537, Jun. 1990.

Derwent Abstract, WPI Acc No. 90–128540/17, Japanese Patent Application No. 2–077483, Mar. 1990.

Derwent Abstract, WPI Acc No. 88–261546/37, Japanese Patent Application No. 63–190800, Aug. 1988.

Derwent Abstract, WPI Acc No. 87–034097/05, Japanese Patent Application No. 61–291659, Dec. 1986.

Derwent Abstract, WPI Acc No. 88–052867/08, Japanese Patent Application No. 63–008442, Nov. 1988.

Chemical Abstract vol. 114, No. 14, Number 124715d Sep. 1990.

Chemical Abstract vol. 112, No. 18, Number 160248w, Feb. 1988.

Chemical Abstract vol. 110, No. 6, Number 48370n, Dec. 1986.

Chemical Abstract vol. 69, No. 18, Number 68396p, Oct. 1967.

Chemical Abstract vol. 94, No. 16, Number 122906m, Dec. 1980.

Chemical Abstract vol. 66, No. 24, Number 105491b, Dec. 1966.

Chemical Abstract vol. 67, No. 2, Number 3806m, Nov. 1966.

Chemical Abstract vol. 102, N. 4, Number 28447z, Aug. 1984.

Chemical Abstract vol. 100, No. 22, Number 176125s, Dec. 1983.

Chemical Abstract vol. 106, No. 28, Number 224473b, Jan. 1987.

Chemical Abstract vol. 94, No. 8, Number 48630y, Sep. 1980.

Chemical Abstract vol. 88, No. 22, Number 161466p, Feb. 1978.

Chemical Abstract vol. 104, No. 12, Number 90590k, Aug. 1985.

Chemical Abstract vol. 105, No. 8, Number 61488y, Dec. 1985.

Ouyang et al., "Carbon Black Effects on Treadwear," Presented at a Meeting of the Rubber Division, American Chemical Society, Las Vegas, Nevada, May 29–Jun. 1, 1990.

Agostini, et al., "New Compound Technology," Goodyear Technical Center, Luxembourg, no date.

Dialog Abstract of Japanese Application No. 4–362009, Dec. 1992.

Dialog Abstract of Japanese Application No. 4–276000, Oct. 1992.

Studebaker et al., "The Rubber Compound and its Composition," *Science and Technology of Rubber*, Academic Press, 1978, Chapter 9, pp. 367–375, no month available.

"Tires," Reprinted from *Encyclopedia of Polmer Science and Engineering*, vol. 16, Second Edition, 1969, pp. 834–861, no month available.

Tsubokawa et al., "Grafting Onto Carbon Black Having Few Functional Groups," Shikizai Kyokaisha, vol. 66, No. 5 (1993), Abstract only, no month available.

J.B. Donnet et al., "Radical Reactions and Surface Chemistry of Carbon Black," Bull. Soc. Chim. 1960 (Abstract Only), no month available.

Concise Encyclopedia of Polymer Science and Engineering, Wiley, 1990, pp. 104–105, no month.

Carbon (Carbon Black) Reprinted from Kirk–Othmer:Encyclopedia of Chemical Technology, vol. 4, Third Edition, pp. 631–643, 1978, no month available.

Delamar et al., J. Am. Chem. Soc. 1992, 114, 5883–5884, no month available.

Kang, "Water–Based Ink–Jet Ink," J. Imaging Science, vol. 35, No. 3, May/Jun., 1991, p. 195–201.

PCT Search Report PCT/US 96/07310, mailed Jan. 14, 1997.

INK AND COATING COMPOSITIONS CONTAINING SILICON-TREATED CARBON BLACK

This is a division of application Ser. No. 08/663,693, filed Jun. 14, 1996, currently pending.

BACKGROUND OF THE INVENTION

1. Field of the Invention

This invention relates to ink and coating compositions containing silicon-treated carbon black.

2. Discussion of the Related Art

Inks are colored liquids or pastes formulated to transfer an image. Pigments such as carbon black are used to impart desired properties to an ink system. Desired properties of inks include visual characteristics such as jetness, opacity, and blue tone. Other performance characteristics include appropriate rheological properties, waterfastness and permanence. For economic reasons, it is desirable to have a pigment that readily disperses in the ink formulation. The measure of the rate of dispersion is the premix residue. Properties such as premix residue thus have a significant influence on the economics of ink production.

Coatings are used for decorative, protective and functional treatments of many kinds of surfaces. Pigments are also commonly used in coatings to impart desired properties. Desired properties similarly may include jetness, opacity, and blue tone, as well as appropriate rheological properties. As in inks, for economic reasons, it is desirable to have a pigment that readily disperses in the coating formulation. Some coatings, such as those on undersea pipelines, are for protective purposes. Others, such as exterior automobile coatings, fulfill both decorative and protective functions. Still others provide friction control on boat decks or car seats.

There remains a need for improved ink and coating compositions available for use in a variety of applications.

SUMMARY OF THE INVENTION

The present invention relates to ink and coating compositions comprising a silicon-treated carbon black. The silicon-treated carbon black may have at least one attached organic group. The present invention also relates to ink and coating compositions comprising a combination of silicon-treated carbon black products, with and/or without at least one attached organic group, and untreated carbon black. The present invention further relates to methods for: improving the jetness, improving the blue tone, improving the platewear, reducing the premix residue, modifying rheological properties, or improving waterfastness, of ink and coating compositions by incorporating therein silicon-treated carbon black.

Both the foregoing general description and the following detailed description are exemplary, and are intended to provide further explanation of the invention as claimed.

DETAILED DESCRIPTION OF THE INVENTION

The present invention relates to ink and coating compositions comprising silicon-treated carbon black.

The ink and coating compositions of the present invention may comprise a silicon-treated carbon black. The silicon-treated carbon black may have no attached organic group or may have at least one attached organic group; or it may comprise both silicon-treated carbon black having at least one attached organic group and silicon-treated carbon black having no attached organic group. Untreated carbon black may be combined with either type of silicon-treated carbon black, or with a mixture of both types of silicon-treated carbon black. "Untreated carbon black" is carbon black that has not been treated with silicon. "Untreated carbon black" may be completely untreated, may have one or more attached organic groups, or may have been otherwise treated.

The ink and coating compositions of the invention advantageously provide an improvement in one or more of jetness, blue tone, platewear, premix residue, rheological properties, and waterfastness.

The silicon-treated carbon black of the ink or coating of the present invention typically contains from about 0.1 to about 25 weight % silicon, based on the weight of the silicon-treated carbon black. Preferably, the silicon-treated carbon black contains from about 0.2 weight % to about 10 weight % silicon, and more preferably about 0.2 to about 5.4 weight %, based on the weight of the silicon-treated carbon black.

Typically, the silicon-treated carbon black may be present in the ink or coating in amounts up to about 60% by weight, based on the weight of the ink or coating. Preferably the silicon-treated carbon black is present between about 10 and about 25% by weight for finished inks and between about 2 and about 25% by weight for coatings. In both inks and coatings, it is not unusual to disperse the carbon black at a higher loading and then reduce it to the final desired loading after the dispersion step.

The ink and coating compositions of the present invention may be aqueous or non-aqueous, and the ink compositions may be used in ink jet applications. Aqueous includes mixtures of water and other water-miscible or -dispersible substances, such as alcohol. The ink and coating compositions of the present invention may exhibit unique rheological properties, depending on whether the compositions are aqueous or nonaqueous and on the particular base used in the composition.

The ink compositions of the invention may further optionally include resins/polymers, additives, fillers and/or diluents.

When used, ink composition ingredients such as those listed above are weighed, and mixed and ground together or separately, according to desired formulas.

The ink compositions of the invention are useful in, by way of example, printing inks, ultraviolet cure inks, ball point inks, stamp pad inks, and inks for other applications. McGraw-Hill's Encyclopedia of Science and Technology, 6th Edition, Vol. 9, pages 171–176, provides further details of the types of inks available and their uses, all of which is incorporated herein by reference.

For a general discussion on the properties, preparation and uses of aqueous inks, see, The Printing Manual, 5th Ed., Leach et al., Eds. Chapman and Hall, 1993, incorporated herein by reference. Various aqueous ink compositions are also disclosed, for example, in U.S. Pat. Nos. 2,833,736, 3,607,813, 4,104,833, 4,308,061, 4,770,706 and 5,026,755, the disclosures of which are incorporated herein by reference.

Non-aqueous inks are used for many applications where aqueous vehicles are not suitable. For instance, inks which are to be printed on hydrophobic, non-porous substrates such as glass, metal or plastics must be fast drying. Therefore, solvents such as ketones, esters, alcohols or hydrocarbons are often used instead of water. Such solvent based inks are used widely for industrial labeling of cardboard boxes and various metal or plastic containers and components.

One common type of nonaqueous ink is newsink. A typical newsink can be made in two stages. First, a pigment, e.g., the silicon-treated carbon black of the present invention, and a vehicle are mixed to form a 'premix', and the premix is then milled to achieve optimum dispersion of the pigment . Generally, lower premix residues result in faster or improved dispersion, which results in improved economy for the producer.

Flow properties of ink at low shear rates are affected by the dispersion characteristics of the ink's pigments. Depending on the application, different levels of flow are desirable. In screen printing inks, it is desirable to have inks with short flow so that the inks do not flow through the screen prematurely. In offset printing, longer flows may be desirable as the ink travels over the inking rollers. Rheological additives are often added to adjust such flows.

Ink jet printing is a non-impact process wherein droplets of ink are produced and deposited on a substrate such as paper, transparent film, or textile material in response to an electrical signal. Conventional inks for ink jet printers comprise a colorant such as a dye which is soluble in the ink vehicle. Dyes have several disadvantages when used in ink jets, however. Dyes may redissolve in water, dye images smear or rub off on contact with felt pen markers, and dyes exhibit poor light stability. Pigments used as colorants in ink jet inks offer superior properties in such areas as waterfastness, lightfastness, image density and thermal stability. The silicon-treated carbon black pigment must be dispersed and stabilized in the ink jet ink so that properties such as ejectability, print quality, and optical density are not detrimentally affected.

The coating compositions of the invention include silicon-treated carbon black pigment, a solvent, and, optionally, one or more ingredients selected from binders, for example, resins or polymers, and other various additives. Coatings can be manufactured and applied as liquids and are converted to "solid" films after application to the substrate. Coatings are used for decorative, protective and functional treatments of many kinds of surfaces. These surfaces include coils, metals, appliances, furniture, hardboard, lumber and plywood, marine, maintenance, automobiles, cans and paperboard.

As mentioned above, the ink and coating compositions of the present invention may comprise any of a number of additives.

For instance, in an ink composition for use as an ink jet ink, a humectant may be added to reduce the rate of evaporation of water in an ink composition to minimize printhead nozzle clogging in ink jet applications, for example. If the ink begins to dry out, the humectant concentration increases and evaporation decreases further. Humectants may also affect other properties of inks and coatings, such as viscosity, pH, surface tension, optical density, and print quality. Preferred humectants include ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones.

Biocides such as benzoate or sorbate salts may be important in aqueous inks and coatings to prevent bacterial growth.

Binders that attach to the substrate to hold the colorant on the substrate may be added in a variety of ink and coating compositions. Examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. Drying accelerating agents promote evaporation once the ink or coating is placed on the substrate. These include sodium lauryl sulfate, N,N-diethyl-m-toluamide, cyclohexylpyrrolidinone, and butyl carbitol. Penetrants such as alcohols, sodium lauryl sulfate, esters, and ketones allow an ink to penetrate the surface of the paper. Alcohols may also be used to increase the rate of drying of the liquid ink or coating. And surfactants like detergents and soap reduce the surface tension to allow the ink or coating to spread on the substrate.

The ink and coating compositions of the present invention may be prepared utilizing conventional techniques. Specifically, milling, such as steelshot milling or three-roll mixing, may be employed to obtain good dispersion of the silicon-treated carbon black in the composition.

The silicon-treated carbon black pigment of the present invention may be obtained by manufacturing the carbon black in the presence of volatilizable silicon-containing compounds. A full description of such a manufacturing process is found in U.S. patent application Ser. No. 08/446, 142 for "Elastomeric Compounds Incorporating Silicon-treated Carbon Blacks and Coupling Agents," and U.S. patent application Ser. No. 08/446,141 for "Elastomeric Compounds Incorporating Silicon-treated Carbon Blacks," the disclosures of which are fully incorporated herein by reference. The silicon-treated carbon blacks are preferably produced in a modular or "staged" furnace carbon black reactor. Hot combustion gases are generated by contacting a liquid or gaseous fuel with a suitable oxidant stream such as air, oxygen, or mixtures of air and oxygen. Among the fuels suitable for use in contacting the oxidant stream are any readily combustible gas, vapor or liquid streams such as natural gas, hydrogen, methane, acetylene, alcohols, or kerosene. It is generally preferred, however, to use fuels having a high content of carbon-containing components and in particular, hydrocarbons. The ratio of air to fuel varies with the type of fuel utilized. When natural gas is used to produce the carbon blacks of the present invention, the ratio of air to fuel may be from about 10:1 to about 1000:1 by volume. To facilitate the generation of hot combustion gases, the oxidant stream may be pre-heated.

Carbon black feedstock is injected into the gas stream at a point downstream of the flow. Preferred carbon black feedstocks include petroleum refinery sources such as decanted oils from catalytic cracking operations, as well as the by-products from coking operations and olefin manufacturing operations. In the reaction zone portion of the reactor, the feedstock is pyrolyzed to carbon black. The reaction is arrested in a quench zone of the reactor, the quench serving to cool the carbon black particles, reduce the temperature of gaseous stream, and decrease the reaction rate. Optionally, quenching may be staged, or take place at several points in the reactor. After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter, or other means known to those skilled in the art. After the carbon black has been separated from the gas stream, it is optionally subjected to a pelletization step.

The silicon-treated carbon blacks of the present invention may be produced by introducing a volatilizable silicon-containing compound into the carbon black reactor at a point upstream of the quench zone. Useful volatilizable compounds include any compound that is volatilizable at carbon black reactor temperatures. Examples include, but are not limited to, silicates such as tetraethoxy orthosilicate (TEOS), tetramethoxy orthosilicate, and the like; silanes such as tetrachloro silane, trichloro methylsilane, and the like; and volatile silicone polymers such as octamethylcyclotetrasiloxane (OMTS) and the like. The flow rate of the volatilizable compound will determine the weight percent of silicon in the treated carbon black.

The volatilizable compound may be premixed with the carbon black-forming feedstock and introduced with the feedstock into the reaction zone. Alternatively, the volatilizable compound may be introduced to the reaction zone separately from the feedstock injection point. Such introduction may be upstream or downstream from the feedstock injection point, provided the volatilizable compound is introduced upstream from the quench zone. Upon volatilization and exposure to high temperatures in the reactor, the compound decomposes, and reacts with other species in the reaction zone, yielding silicon-treated carbon black, such that the silicon, or the silicon-containing species, becomes an intrinsic part of the carbon black. If the volatilizable compound is introduced substantially simultaneously with the feedstock, the silicon-treated regions are distributed throughout at least a portion of the carbon black aggregate. The volatilizable compound may alternatively be introduced to the reaction zone at a point after carbon black formation has commenced but before it has been subjected to the quench. In this case, silicon-treated carbon black aggregates are obtained in which silicon or a silicon-containing species is present primarily at or near the surface of the carbon black aggregate. Besides volatilizable compounds, decomposable compounds that are not necessarily volatilizable can also be used to yield the silicon-treated carbon blacks. In addition, carbon black coated with silica, as described in U.S. patent application Ser. No. 08/446,140 for "Elastomeric Compounds Incorporating Partially Coated Carbon Blacks," now abandoned the disclosure of which is herein incorporated by reference, may also be used in the ink and coating compositions of the present invention.

In the silicon-treated carbon black of the present invention, silicon or a silicon-containing species, including but not limited to, silicon oxides, e.g., $SiO_2$, and silicon carbides, may be distributed through at least a portion of the carbon black aggregate as an intrinsic part of the carbon black. Silicon-treated carbon black aggregates of the present invention are not a mixture of discrete carbon black aggregates and discrete silica aggregates, but include at least one silicon-containing region either at the surface of or within the carbon black aggregate. When the silicon-treated carbon black is examined under STEM-EDX (Scanning Transmission Electron Microscope—Energy Dispersive X-ray), the silicon signal corresponding to the silicon-containing species is found to be present in individual carbon black aggregates. By comparison, in a physical mixture of silica and carbon black, STEM-EDX examination reveals distinctly separate silica and carbon black aggregates.

Optionally, the silicon-treated carbon blacks of the present invention may have at least one organic group attached. Such carbon blacks can be prepared, for example, based on the disclosures in U.S. patent application Ser. No. 081356,660, filed Dec. 15, 1994, and its continuation-in-part application, Ser. No. 08/572,525, filed Dec. 14, 1995, the disclosures of which are fully incorporated by reference herein. The organic group or groups are preferably attached to the silicon-treated carbon black in accordance with the methods disclosed in the above applications.

The organic group may be an aliphatic group, a cyclic organic group, or an organic compound having an aliphatic portion and a cyclic portion. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, triazinyl, indolyl, and the like).

When the organic group is substituted, it may contain any functional group compatible with the formation of a diazonium salt. Functional groups include, but are not limited to, R, OR, COR, COOR, OCOR, halogen, CN, $NR_2$, $SO_2NR$ (COR), $SO_2NR_2$, NR(COR), $CONR_2$, $NO_2$, $SO_3M$ (where M is H, Li, Na, Cs, or K), $SO_3NR_4$, and N=NR'. R is independently hydrogen, $C_1$–$C_{20}$ substituted or unsubstituted alkyl (branched or unbranched), $C_2$–$C_{20}$ substituted or unsubstituted alkenyl, $(C_2$–$C_4$ alkyleneoxy$)_x$R", or a substituted or unsubstituted aryl. R' is independently hydrogen, $C_1$–$C_{20}$ substituted or unsubstituted alkyl (branched or unbranched), or a substituted or unsubstituted aryl. R" is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl, or a substituted or unsubstituted aroyl. The integer x ranges from 140 and preferably from 2–25.

One organic group is an aromatic group of the formula $A_yAr$—, which corresponds to a primary amine of the formula $A_yARNH_2$. In this formula, the variables have the following meanings: Ar is an aromatic radical selected from the group consisting of phenyl, naphthyl, anthracenyl, phenanthrenyl, biphenyl, pyridinyl, and triazinyl; A is a substituent on the aromatic radical independently selected from a functional group described above or A is a linear, branched or cyclic hydrocarbon radical (preferably containing 1 to 20 carbons), unsubstituted or substituted with one or more of those functional groups; and y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl, or 1 to 2 when Ar is triazinyl. When A is a $(C_2$–$C_4$ alkyleneoxy$)_x$R" group, it may be a polyethoxylate group, a polypropoxylate group, or a random or block mixture of the two.

The carbon black may have an attached organic group having a) an aromatic group or a $C_1$–$C_{12}$ alkyl group and b) at least one group of the formula $SO_2NR_2$ or $SO_2NR(COR)$. R may be independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy$)_x$R' or a substituted or unsubstituted aryl; R' is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or substituted or unsubstituted aroyl; and x is from 1 to 40. Aromatic groups include $p$-$C_6H_4SO_2NH_2$, $p$-$C_6H_4SO_2NH_6H_{13}$, p-$C_6H_4SO_2NHCOCH_3$, p-$C_6H_4SO_2NHCOC_5H_{11}$, and p-$C_6H_4SO_2NHCOC_6H_5$.

Organic groups which may be attached to the silicon-treated carbon black are organic groups substituted with an ionic or an ionizable group as a functional group. An ionizable group is one capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. When an organic group contains an ionizable group forming an anion, such an organic group may have a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. Preferably, the pKa is less than 10 and more preferably less than 9. The aromatic group or the $C_1$–$C_{12}$ alkyl group of the organic group may be directly attached to the carbon black. The aromatic group may be further substituted or unsubstituted, for example, with alkyl groups. The organic group may be a phenyl or a naphthyl group and the acidic group is a sulfonic acid group, a sulfinic acid group, a phosphonic acid group, or a carboxylic acid group. The organic group may also be a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. One substituted sulfophenyl group is a hydroxysulfophenyl group or a salt thereof.

Specific organic groups having an ionizable functional group forming an anion are p-sulfophenyl, 4-hydroxy-3-sulfophenyl, and 2-sulfoethyl.

Amines represent examples of ionizable functional groups that form cationic groups. For example, amines may be protonated to form ammonium groups in acidic media. Preferably, an organic group having an amine substituent has a pKb of less than 5. Quaternary ammonium groups and quaternary phosphonium groups also represent examples of cationic groups. Preferably, the organic group contains an aromatic group such as a phenyl or a naphthyl group and a quaternary ammonium or a quaternary phosphonium group. The aromatic group is preferably directly attached to the silicon-treated carbon black. Quaternized cyclic amines, and even quaternized aromatic amines, can also be used as the organic group. Thus, N-substituted pyridinium compounds, such as N-methyl-pyridyl, can be used in this regard. Other examples include, but are not limited to, 3-$C_5H_4N(C_2H_5)^+$ $X^-$, $C_6H_4NC_5H_5^+X^-$, $C_6H_4COCH_2N(CH_3)_3^+X^-$, $C_6H_4COCH_2(NC_5H_5)^+X^-$, 3-$C_5H_4N(CH_3)^+X^-$, $C_6H_4N(CH_3)_3^{+X^-}$, and $C_6H_4CH_2N(CH_3)_3^+X^-$, where $X^-$ is a halide or an anion derived from a mineral or organic acid.

Alternatively or in combination with the above-described methods of attachment, chemical groups can be attached by reacting with the surface functional groups in the silicon-treated carbon black. For example, the silicon-treated carbon black can be reacted with a trialkoxyalkylsilane, such as octadecyltriethoxysilane, to enhance the compatibility of certain compositions.

The present invention further relates to methods for: improving the jetness, improving the blue tone, improving the platewear, reducing the premix residue, modifying rheological properties, or improving waterfastness, of ink and coating compositions by incorporating therein silicon-treated carbon black.

In a method for improving the jetness of an ink or coating composition, the silicon-treated carbon black preferably contains 0.2 to 5.4 weight percent silicon, based on the weight of the silicon-treated carbon black. In a method for improving the blue tone of an ink or coating composition, the silicon-treated carbon black preferably contains 0.2 to 5.4 weight percent silicon, based on the weight of the silicon-treated carbon black. In a method for improving the platewear of an ink or coating composition, the silicon-treated carbon black preferably contains 0.2 to 25 weight percent silicon, more preferably 0.2 to 10 weight percent, based on the weight of the silicon-treated carbon black. In a method for reducing the pre-mix residue of an ink or coating composition, the silicon-treated carbon black preferably contains 0.2 to 25 weight percent silicon, more preferably 0.2 to 10 weight percent, based on the weight of the silicon-treated carbon black. In a method for modifying the rheological properties of an ink or coating composition, the silicon-treated carbon black preferably contains 1 to 25 weight percent silicon, based on the weight of the silicon-treated carbon black. And in a method for improving the waterfastness of an ink or coating composition, the silicon-treated carbon black preferably contains 0.2 to 25 weight percent silicon, based on the weight of the silicon-treated carbon black.

The invention will be further clarified by the following examples, which are intended to be purely exemplary of the invention.

In the examples, below, DBP absorption is measured by the method ASTM D2414. Similarly, CDBP and tinting strength are measured by the methods ASTM D3493 and ASTM D3265.

The nitrogen and external surface area (t-area) is measured following the example preparation and measurement procedure described in ASTM D3037. For this measurement the nitrogen adsorption isotherm is extended up to 0.55 relative pressure. The relative pressure is the pressure (P) divided by the saturation pressure ($P_o$) (the pressure at which the nitrogen condenses). The adsorption layer thickness ($t_1$) was then calculated using the relation $$t_1 = \frac{13.99}{\sqrt{0.034 - \log(P/P_o)}}$$

The volume (V) of nitrogen adsorbed was then plotted against $t_1$. A straight line was then fitted through the data points for $t_1$ values between 3.9 and 6.2 Angstroms. The t-area was then obtained from the slope of this line as follows:

$$t\text{-area}, m^2/g = 15.47 \times \text{slope}$$

Hunter color is measured using Hunter Lab Scan 6000, 10 degree, D 65 CIELAB Color Space instrument manufactured by Hunter Associates in Fairfax, Va. The instrument is calibrated using the standard black and white tiles. "L" is the lightness/darkness scale with higher numbers being lighter, "a" is the redness (+)/greenness (−) scale, and "b" is the yellowness (+)/blueness (−) scale. The color values are obtained from a print or draw down of the ink on a paper substrate.

Rub-off is measured using Method A-9 of the Newspaper Association of America. Platewear is measures by placing a portion of the ink on a felt substrate and mechanically rubbing it repeatedly for 6 hours with a brass plate under a standard pressure. The weight loss of the brass plate after 6 hours is rendered as the platewear in grams.

Dispersion classification is made by viewing a 0.1 mil wet film with a transmission microscope at 100× magnification. The level of dispersion (i.e., the quantity and size of the undispersed black) is compared to a standard chart. The scale goes from A to F for the quantity of undispersed agglomerates and from 1 to 6 for size. The higher the number and the lower the letter, the poorer the dispersion quality.

Gloss is measured using ASTM method D523. Steel Bar Laray viscosity is measured using ASTM method D4040. Vertical Glass Plate flow is measured by the distance a 0.5 cc sample of ink travels down a vertical glass plate after the samples are allowed to rest for 0, 30 and 60 minutes prior to standing the plate. Spreadometer properties are measured using a Toyoseiki spreadometer, manufactured by Testing Machines Inc., as described in the Japanese Industrial Standard, Testing Methods for Lithographic and Letterpress Inks (JIS K57014.1.2).

Residue is measured by pouring the ink formulations onto a pair of stacked screens with the top and bottom screens being +325M and +625M respectively. The screens are then washed with mineral spirits until the spirits are observed visually to be clear. The screens are then dried in a vented oven at approximately 220° F. The residue on the +325M screen is then weighed to determine +325M residue as a weight percent of the initial ink formulation.

EXAMPLE 1

Three carbon blacks were evaluated in a standard low-rub newsink formulation. The blacks are described in Table I below. Sample A is a conventional carbon black and Samples B and C are silicon-treated carbon blacks. The silicon-treated carbon blacks are produced by premixing OMTS with the carbon black forming feedstock as described above. The three carbon blacks are described in Table I below.

TABLE I

| Sample | % Si based on wt. of carbon black | DBP Absorption (cc/100 g) | t-Area (m²/gm) |
|---|---|---|---|
| A | 0.02 | 121 | 71 |
| B | 0.98 | 118 | 71 |
| C | 5.38 | 126 | 71 |

Each carbon black was pre-mixed in a naphthenic oil-based newsink composition at 20 weight % carbon black loading for 35 minutes using a Dispermat® high speed disk disperser (Getzman GmBH, Germany) at 2300 feet per minute tip speed. The mix was then dispersed in a vertical shot mill containing 1.5 mm steel shot (#550 from Schold Machine Corp., Chicago, Ill.) until the dispersion quality, as measured with a NPIRI Grindmeter using ASTM method D1316, contained no 'scratches' and where the 'speckles' disappeared at 20 microns or less. The final dispersion was then reduced to 16 weight % carbon black with the reduction vehicle. The ink composition for all three carbon blacks is presented in Table II below.

TABLE II

| Mix | Ingredients | Weight % |
|---|---|---|
| Dispersion (premix) | Hyprene® V2000 Naphthenic Oil | 59.44 |
| | Hyprene® V750 Naphthenic Oil | 15.60 |
| | Exxprint® 991 (Asphaltic Dispersant) | 4.96 |
| | Carbon Black | 20.00 |
| Letdown (reduction) | Dispersion | 80.00 |
| | Picco® 5140 Hydrocarbon Resin | 5.00 |
| | Magie® 47 Naphthenic Oil | 5.00 |
| | Hyprene® V2000 Naphthenic Oil | 8.66 |
| | Claytone® AF (Bentonite Clay) | 1.34 |

The Hyprene® products were obtained from Ergon Refining, Vicksburg, MS.
Exxprint® was obtained from Exxon, Houston, TX.
Picco® resin was obtained from Hercules Inc., Wilmington, DE.
Magie® oil was obtained from Magie Bros., Franklin Park, IL.
Claytone® was obtained from Southern Clay Products, Gonzales, TX.

The results of testing are shown in Table III below. All prints were prepared for evaluation by printing to an optical density of 1.0 on newsprint using an RNA 52 Printability Tester manufactured by Research North America, Cherry Hill, N.J.

TABLE III

| Property/Sample | A | B | C |
|---|---|---|---|
| Dispersion (4 Scratch/10 Scratch/Speckles) | | | |
| 2 minutes - microns | 0/0/40 | 0/0/30 | 6/0/50 |
| 4 minutes - microns | 0/0/22 | 0/0/21 | 0/0/35 |
| 6 minutes - microns | 0/0/16 | 0/0/17 | 0/0/22 |
| 8 minutes - microns | — | — | 0/0/19 |
| Premix Residue (% + 325 mesh) | 3.05 | 1.55 | 1.05 |
| Final Residue (% + 325 mesh) | 0.010 | 0.008 | 0.008 |
| 3 hour ruboff (optical density) | 0.21 | 0.20 | 0.20 |
| Platewear (grams/6 hours) | 0.0217 | 0.0195 | 0.0176 |
| Hunter Color | | | |
| L | 38.77 | 36.79 | 37.94 |
| a | 1.40 | 1.35 | 1.36 |
| b | 6.32 | 5.91 | 6.18 |

The premix residue was lower for the silicon-treated carbon blacks. The silicon-treated carbon blacks showed improved jetness and bluer tone as measured by the lower L and b values for the Hunter Color of Samples B and C relative to Sample A. The silicon-treated carbon blacks also showed improved platewear over Sample A.

EXAMPLE 2

Three carbon blacks were evaluated in a standard aqueous acrylic flexographic formulation. Sample D was a conventional carbon black and Samples E and F were silicon-treated carbon blacks. The carbon blacks are described in Table IV below. The silicon-treated carbon blacks were produced as described earlier by premixing OMTS with the carbon black producing feedstock.

TABLE IV

| Sample | % Si based on wt. of carbon black | DBP Absorption (cc/100 g) | t-Area (m²/gm) |
|---|---|---|---|
| D | 0.06 | 102 | 95 |
| E | 1.30 | 106 | 103 |
| F | 5.50 | 114 | 95 |

Each carbon black was pre-mixed in an aqueous acrylic flexographic ink composition at 24.4 weight % carbon black for 30 minutes using a Dispermat® high speed disk disperser at 2300 feet per minute tip speed. The pre-mix was then dispersed in a horizontal shot mill (Model M-50 Eiger Machinery, Bensonville, Ill.) with 2 mm stainless steel shot. 150 grams of the ink composition was recycled through the mill for 45 minutes at a flow rate of approximately 200 grams per minute. 10 grams of material was removed at 15 minute intervals and reduced to 9.76 weight percent carbon black with additional water and resin prior to color and dispersion evaluation. The reduction was performed by shaking the dispersion, water and resin for 15 minutes on a paint shaker (Model 5400 Red Devil Equipment, Union, N.J.). The ink composition for all three blacks is presented in Table V below.

TABLE V

| Mix | Ingredients | Weight % |
| --- | --- | --- |
| Dispersion (premix) | Joncryl ® 61 Acrylic resin | 31.5 |
| | Joncryl ® 62 Acrylic resin | 10.0 |
| | Dymsol ® 200 (polyethylene glycol) | 5.0 |
| | Byk 020 (polysiloxane defoamer) | 0.5 |
| | Distilled Water | 28.6 |
| | Carbon black | 24.4 |
| Letdown (Reduction) | Dispersion | 40.0 |
| | Joncryl ® 61 Acrylic resin | 55.2 |
| | Distilled water | 4.8 |

Joncry ®1 Acrylic resin was obtained from S. C. Johnson, Racine, WI.
Dymsol ® Acrylic resin was obtained from Henkel Corp., Kankakel, IL.,
Byk 020 was obtained from Byk Chemie, Wallingford, Ct.

The results of the testing are shown in Table VI below.

TABLE VI

| Property/Sample | D | E | F |
| --- | --- | --- | --- |
| Dispersion Classification | | | |
| 15 minutes | 2C | 1E | 1E |
| 30 minutes | 1D | 1C | 1C |
| 45 minutes | 1C | 1B | 1B |
| Final Residue (% + 325 mesh) | 0.0015 | 0.0010 | 0.0003 |
| Hunter Color | | | |
| 15 minutes | | | |
| L | 11.29 | 10.36 | 11.16 |
| a | −0.48 | −0.51 | −0.54 |
| b | −3.18 | −3.30 | −3.34 |
| 30 minutes | | | |
| L | 11.87 | 11.52 | 11.22 |
| a | −0.50 | −0.63 | −0.58 |
| b | −3.19 | −3.33 | −3.41 |
| 45 minutes | | | |
| L | 11.49 | 11.28 | 10.33 |
| a | −0.48 | −0.59 | −0.55 |
| b | −3.14 | −3.44 | −3.41 |

The silicon-treated carbon blacks showed better, i.e., faster, dispersion compared to Sample D. The silicon-treated carbon blacks were also darker and bluer as indicated by the lower Hunter 'L' and more negative Hunter 'b' values.

EXAMPLE 3

The carbon black Samples D, E and F were evaluated in a standard heat set gloss ink formulation prepared on a three-roll mill.

The carbon black samples were prepared for grind on a three roll mill (Kent Machine Works, Brooklyn, N.Y.). A premix consisting of 105 grams of carbon black and 245 grams of grind masterbatch (consisting of 9 parts of LV - 3427XL heatset grinding vehicle obtained from Lawter International, Northbrook, Ill., to 1 part Magie® naphthenic oil) was prepared in the Dispermat running at 5000 rpm for 30 minutes. This mixture, 50 g, was ground on the Kent three roll mill running at 70° F. Samples were let down by mixing with an equal amount of the grind masterbatch and then applied to a NIPRI production grindmeter G-2 for evaluation of grind. Additional passes were made if the grind gauge reading was above 20. The finished ink was produced by mixing the milled material with an equal weight of reduction masterbatch (3 parts LV-3427XL; 12 parts LV 6025, a reduction vehicle obtained from Lawter International, Northbrook, Ill.; 5 parts MAGIESOL 47) and passing one time through the three roll mill.

Fineness of grind data for samples D, E, and F, and viscosity measurements for the resulting inks are shown in Table VII below. The numbers in the grind data table are in microns as measured on a G-2 grind gauge and indicate the level where 5 defect grains are detected on the grind gauge. Designations >50 indicate hangback or separation of the carbon black from the grind vehicle.

Optical properties for inks made from Samples D, E and F were determined from prints made using the RNA-52 printability tester. These values are shown in Table VIII.A and Table VIII.B. Values for 1 and 2 micron film thickness were calculated from regression of the data from the prints having a range of film thicknesses. The higher Si-content sample dispersed somewhat easier than the sample with no added silicon on the three roll mill.

The viscosity measurements in Table VII show the effect of increasing Si-content in this ink formulation. Under conditions of low shear (vertical glass plate flow), Sample F, having the highest Si-content, showed significantly lower flow than either Sample D or E. Once shear is applied to these inks the rheological differences become smaller. The spreadometer slope (indicator of flowability at higher shear) is greater for Sample F, just the opposite of that observed for vertical glass plate flow.

TABLE VII

| Properties/Sample | D | E | F |
| --- | --- | --- | --- |
| Carbon Black Properties | | | |
| Silicon content (% of carbon black) | 0.06 | 1.30 | 5.50 |
| DBP | 102 | 106 | 114 |
| t-area (m²/g) | 95 | 103 | 95 |
| Ink Preparation | | | |
| Grinding Base (5 scr/10 scr/sand) | | | |
| Three roll mill | | | |
| 1 pass | >50 | >50 | >50 |
| 2 pass | >50 | >50 | >50 |
| 3 pass | >50 | >50 | 0/0/46 |
| 4 pass | 0/0/42 | 0/0/50+ | 0/0/30 |
| 5 pass | 0/0/32 | 0/0/42 | 0/0/26 |
| 6 pass | 0/0/24 | 0/0/30 | 0/0/17 |
| 7 pass | 0/0/25 | 0/0/23 | |
| 8 pass | 0/0/24 | 0/0/21 | |
| Ink Properties | | | |
| Steel Bar Laray Viscosity | | | |
| Viscosity (poise at 2500 s⁻¹) | 61.9 | 67.0 | 63.2 |
| Yield Value (dyne/cm at 2.5 s⁻¹) | 695 | 590 | 621 |
| Vertical Glass Plate Flow (mm) | | | |
| No Setting | | | |
| 20 minutes | 70 | 75 | 45 |
| 40 minutes | 85 | 89 | 51 |

TABLE VII-continued

| Properties/Sample | D | E | F |
|---|---|---|---|
| 60 minutes | 99 | 100 | 55 |
| 30 minutes setting | | | |
| 20 minutes | 50 | 46 | 21 |
| 40 minutes | 65 | 60 | 31 |
| 60 minutes | 75 | 71 | 36 |
| 60 minutes setting | | | |
| 20 minutes | 45 | 40 | 19 |
| 40 minutes | 57 | 52 | 27 |
| 60 minutes | 69 | 61 | 34 |
| Spreadometer Properties | | | |
| Slope (mm) | 8.3 | 8.1 | 9.7 |
| Intercepter (mm) | 27.7 | 25.8 | 24.7 |
| Yield Value (dyne/cm$^2$) | 121.7 | 120.1 | 121.7 |

TABLE VIII.A

Optical Properties of a 1 micron film made from Samples D–F

| SAMPLE | OD | L | a | b | Gloss 60° |
|---|---|---|---|---|---|
| D | 1.23 | 28.4 | 1.18 | 3.48 | 40.9 |
| E | 1.23 | 27.8 | 1.21 | 3.41 | 38.7 |
| F | 1.28 | 27.7 | 1.35 | 4.00 | 38.3 |

TABLE VIII.B

Optical Properties of a 2 micron film made from Samples D–F

| SAMPLE | OD | L | a | b | Gloss 60° |
|---|---|---|---|---|---|
| D | 2.04 | 8.2 | 0.54 | 0.45 | 46.8 |
| E | 2.08 | 7.9 | 0.80 | 0.74 | 43.7 |
| F | 1.80 | 12.7 | 1.23 | 2.49 | 44.1 |

It is seen that at a relatively high level of silicon treatment, 5.5% Si by weight, there is a significant decrease in flowability at low shear (low values of vertical glass plate flow) and a significant increase in flowability at higher shear (high values of slope of spreadometer properties). Thus, the silicon-treated carbon black can be used as a rheological modifier.

EXAMPLE 4

Inkjet inks were prepared from silicon-treated carbon blacks G and H (described below) having attached $C_6H_4(NC_5H_5)^+$ groups. Silver nitrite (2.85 g) was added to a solution of 3.1 g of N-(4-aminophenyl)pyridinium chloride in 100 g of water and the mixture was stirred at 70°–80° C. for one hour. The mixture was filtered after stirring overnight at room temperature. Each of the two silicon-treated carbon blacks (10 g @) were separately added to 35 grams of the filtrate, and about 55 grams of water was added. The resulting mixtures were heated to 70° C. and 0.5 gram of 37% aqueous HCl was added. The dispersions were stirred at 70° C. for 1.5 hours and at room temperature overnight. Thus, mixtures were formed of silicon-treated carbon blacks having attached $C_6H_4(NC_5H_5)^+$ groups and water.

Sample G is a silicon-treated carbon black containing 1.6% silicon that has a t-area of 119 m$^2$/g and a DBP absorption value of 115 cc/100 g. Sample H is a silicon-treated carbon black that contains 5.2% silicon and has a t-area of 125.5 m$^2$/g and a DBP adsorption of 105 cc/100 g. The samples were produced by premixing OMTS with the carbon black producing feedstock, as discussed above.

Inks were prepared by diluting the dispersions with water so the solids contents were 3–7 weight % as shown below. The inks were drawn down as a film using a 3 Mil Bird applicator and allowed to dry for 10 minutes. A portion of the image was rinsed with a stream of water until no additional ink was washed off. After drying at room temperature, the optical densities of the washed and unwashed portions were measured to determine the percent of waterfastness. These results are summarized in Table IX.

Mean particle diameters and the maximum particle diameters were measured using a MICROTRAC Ultrafine Particle Analyzer from Leeds & Northrup Co., St. Peterburg, Fla.

Surface tensions of the inks were measured using a CSC DU NUOY Tensiometer, No. 70535 from CSC Scientific Co., Inc., Fairfax, Va. using the ASTM D-1331 and D-1590 procedures.

Viscosities were measured using a No. 1 and No. 2 shell cup from Norcross Corporation, Newton, Mass. using ASTM procedure D4212.

TABLE IX

| Run | Sample | Mean particle size, μ | Maximum particle size, μ | Solids Wt. % | Surface tension, dynes/cm | Viscosity cP | Optical density before washing | Optical density after washing | Waterfastness (% retained) |
|---|---|---|---|---|---|---|---|---|---|
| 1 | G | 0.23 | 0.58 | 3 | — | — | 1.51 | 1.48 | 98 |
| 2 | G | 0.23 | 0.58 | 5 | 73.8 | 1.5 | 1.63 | 1.57 | 96 |
| 3 | G | 0.23 | 0.58 | 7 | — | — | 1.66 | 1.54 | 93 |
| 4 | H | 0.24 | 0.69 | 3 | — | — | 1.49 | 1.45 | 97 |
| 5 | H | 0.24 | 0.69 | 5 | 74.1 | 1.5 | 1.68 | 1.61 | 95 |
| 6 | H | 0.24 | 0.69 | 7 | — | — | 1.69 | 1.61 | 95 |

These results show that the silicon-treated carbon blacks are useful in inkjet inks, and that prints made from these inks have excellent waterfastness.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An ink composition comprising an aggregate comprising a carbon phase and a silicon-containing species phase and an aqueous or non-aqueous vehicle.

2. The ink composition of claim 1, wherein at least a portion of the aggregate is aggregate having at least one organic group attached.

3. The ink composition of claim 1, further comprising carbon black having at least one organic group attached, or mixtures of carbon black having at least one organic group attached and an aggregate comprising a carbon phase and a silicon-containing species phase having at least one organic group attached.

4. The ink composition of claim 1, further comprising untreated carbon black.

5. The ink composition of claim 1, wherein the aggregate is present in an amount up to 60% by weight of the composition.

6. The ink composition of claim 1, wherein said silicon-containing species phase exists as regions primarily at the surface of the aggregate.

7. The ink composition of claim 1, wherein said silicon-containing species phase exists as regions dispersed throughout the aggregate.

8. The ink composition of claim 1, wherein said silicon-containing species phase comprises from about 0.1 to about 25 wt. % silicon, based on the weight of the aggregate.

9. The ink composition of claim 8, wherein said silicon-containing species phase comprises from about 0.2 to about 10 wt. % silicon, based on the weight of the aggregate.

10. The ink composition of claim 9, wherein said silicon-containing species phase comprises from about 0.2 to about 5.4 wt. % silicon, based on the weight of the aggregate.

11. The ink composition of claim 1, where the composition is aqueous.

12. The ink composition of claim 1, where the composition is non-aqueous.

13. An aqueous ink jet ink composition comprising an aqueous vehicle and an aggregate comprising a carbon phase and a silicon-containing species phase.

14. A nonaqueous ink jet ink composition comprising a nonaqueous vehicle and an aggregate comprising a carbon phase and a silicon-containing species phase.

15. The ink composition of claim 2, wherein said attached organic group is selected from an ionic group, an ionizable group, or mixtures thereof.

16. The ink composition of claim 15, wherein said attached organic group is selected from sulfonic acid or salts thereof, carboxylic acid or salts thereof, a quaternary ammonium group, $SO_2NR_2$, or $SO_2NR(COR)$, where R is independently hydrogen, a $C_1$–$C_{20}$ substituted or unsubstituted alkyl, a $C_3$–$C_{20}$ substituted or unsubstituted alkenyl, $(C_2$–$C_4$ alkyleneoxy)$_x$R' or a substituted or unsubstituted aryl, and R' is hydrogen, a $C_1$–$C_{20}$ substituted or unsubstituted alkyl, a $C_3$–$C_{20}$ substituted or unsubstituted alkenyl, a $C_1$–$C_{20}$ substituted or unsubstituted alkanoyl or substituted or unsubstituted aroyl; and x is from 1 to 40.

17. The ink composition of claim 15, where said attached organic group is p-$C_6H_4SO_3Na$.

18. The ink composition of claim 15, where said attached organic group is p-$C_6H_4CO_2H$.

19. The ink composition of claim 15, where said attached organic group is selected from $C_6H_4NC_5H_5^+X^-$ or $C_6H_4N(CH_3)_3^+X^-$, where $X^-$ is a halide or an anion derived from a mineral or organic acid.

20. The ink composition of claim 15, where said attached organic group is selected from $C_6H_4SO_2NH_2$ or $C_6H_4SO_2NH(COCH_3)$.

21. A colorant comprising an aggregate comprising a carbon phase and a silicon-containing species phase.

* * * * *